3,198,813
1,4-PREGNADIENE-11α,17α,21-TRIOL-3,20-DIONE
AND ESTERS THEREOF
Arthur Nobile, Roseland, N.J., assignor to Schering Corporation, Bloomfield, N.J., a corporation of New Jersey
No Drawing. Filed July 31, 1964, Ser. No. 386,749
The portion of the term of the patent subsequent to May 26, 1981, has been disclaimed
4 Claims. (Cl. 260—397.45)

This application is a continuation-in-part of my copending application Serial No. 464,159 filed October 22, 1954, the latter being a continuation-in-part of Serial No. 449,257 filed August 11, 1954, both applications now abandoned.

The present invention relates to the manufacture of new 11,21-disubstituted-1,4-pregnadienes, and in particular to 1,4-pregnadiene-11α,17α,21-triol-3,20-dione and the lower alkanoyl esters thereof.

It is the general object of the invention to provide new compounds which are useful intermediates in the preparation of cortical hormones and having improved physiological activity.

More specifically, it is an object of the invention to accomplish one or more of the operations of oxidation, dehydrogenation, and hydrolysis, and including the introduction of a $\Delta^1$-double bond into certain steroid compounds, by subjecting them to the action of a culture of *Corynebacterium simplex* (A.T.C.C. 6946), or of an enzymatic extract of such culture, with or without further purely chemical treatment, whereby the dienes ($\Delta^1$-dehydro derivatives) of cortisone, hydrocortisone and of the 11-epimer of hydrocortisone and of their esters and related compounds are obtained.

Other objects and advantages of the invention will become apparent to those skilled in the art from the following more detailed description and the features of novelty will be set forth in the appended claims.

I have found that the operations of dehydrogenation, oxidation, and selective ester-hydrolysis on various starting steroid compounds whereby the 1,4-dienes of cortisone, hydrocortisone and the 11-epimer of the latter, and their esters, are obtained, can be accomplished in an efficient and inexpensive manner by incubating or fermenting the starting steroid with a culture medium containing *Corynebacterium simplex* (or the enzymatic extract thereof), the nature of the chemical transformation depending upon the character of the starting compound, and that two or more of such reactions, but including dehydrogenation at carbon atoms 1 and 2, can be effected on the same starting material.

The starting steroid compounds are 4- or 5-pregnen-17α,21-diols having either a hydroxyl or a keto group in the 3-, 11- and 20-positions, and esters of such compounds. The presence of a free hydroxyl group appears to promote the chemical transformations, but such transformations occur also if a free hydroxyl group is present only in the 3-position and is itself oxidized to a keto group, and even if no free hydroxyl is contained in the starting compound.

The esters can be of great variety of acids, but are preferably of acids usually employed in steroid synthesis and in preparing steroid hormones for therapeutic use, and particularly of the lower alkanoic acids.

By the process of the present invention, I have been able to convert, for example, 4-pregnen-17α,21-diol-3,11,20-trione (cortisone or Compound E) into 1,4-pregnadien-17α,21-diol-3,11,20-trione; 4-pregnen-11β,17α,21-triol-3,20-dione (hydrocortisone or Compound F) into 1,4-pregnadien-11β,17α,21-triol-3,20-dione; and the corresponding 3-hydroxy and 3-ester compounds, i.e., 4-pregnen-3,17α,21-triol-11,20-dione and 4-pregnen-3,11β,17α,21-tetrol-20-one and their 3-esters, into the same diene end products. An ester group may be present not only in the 3-position but also in one or more of the 11,17 and 21-positions. Where an ester group is present in the 3-position, it is hydrolyzed and the resulting hydroxyl group oxidized to a keto group in the course of the reaction. The ester groups in the 11- and 17-positions are generally not hydrolyzed, at least not to any significant extent; while an ester group in the 21-position may or may not be hydrolyzed, depending on the reaction conditions. Thus, where the starting compound is a 3,21-diester, the reaction product may be a 3-keto-21-ester compound, or a 3-keto-21-hydroxy compound. Along with 3-hydroxyl, also 20-hydroxyl will be oxidized to a keto group. It will thus be seen that the organism employed in the present invention is selective with respect to the oxidation step, this being limited practically completely to the 3- and 20-positions, while the hydrolysis may be restricted to 3-ester groups.

I have found that deacetylation at the 21-position occurs most readily at a pH of 6.8–7.1 and at a temperature of about 26° to 29° C. Hydrolysis is greatly diminished below a pH of 6.5 and at a temperature above 32° C. On the other hand, the introduction of the $\Delta^1$-double bond proceeds satisfactorily outside of the pH and temperature ranges at which deacetylation proceeds most actively; that is, the dehydrogenation occurs at a satisfactory rate at a pH of 7.6–8.0 and at a temperature of 32° to 37° C. These conditions are therefore to be employed if hydrolysis of a 21-ester is to be minimized.

My process is applicable also to the treatment of the 11α-hydroxy epimers of the above-mentioned 11β-hydroxy starting compounds, such as, 4-pregnen-11α,17α,21-triol-3,20-dione, 4-pregnen-11α,17α,20,21-tetrol-3-one, 4-pregnen-3,11α,17α,21-tetrol-20-one, 5-pregnen-3,11α,17α,20,21-pentol, and their mono- and polyesters, like the 3-acetates, 3,21-diacetates, and 3,17α,21-triacetates, these starting compounds yielding 1,4-pregnadien-11α,17α,21-triol-3,20-dione or an ester thereof. These 11-epimers of the 1,4-diene of hydrocortisone and its esters can be converted into the 1,4-diene of cortisone and its esters by oxidation of the 11α-hydroxyl group in known manner, as with the theoretical amount of chromic acid, with or without pyridine or acetic acid, at room temperature or below (5 to 15° C.) preferably after esterifying the 21-hydroxyl if it is free. These 11α-hydroxy starting compounds are relatively easily prepared in high yield as is known in the art, and therefore represent desirable starting compounds for the preparation of the products of the present invention.

The transformations effected by my improved process may be represented schematically as follows:

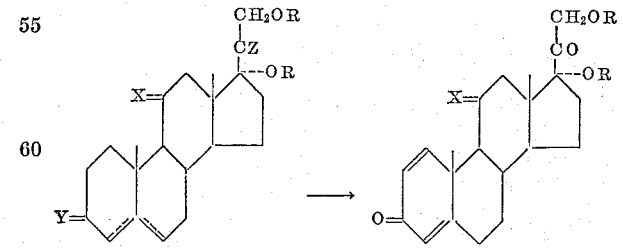

wherein R is H or acyl, X is O or (H, OR), Y is O or (H, OH) and Z is O or (H, OH), the dotted line indicating the alternative position of the double bond.

The importance of my invention is many-fold. It is now possible to prepare easily previously unknown and highly active dienes of cortisone, hydrocortisone and their esters either directly from such compounds or from certain of their intermediates. The obtained dienes posses the same pharmacodynamic properties as do the corresponding singly unsaturated hormones (cortisone, hydrocortisone and their esters), but to a considerably enhanced degree, which makes them valuable agents in the treatment of the many diseases and conditions for which the known hormones are employed.

In clinical testing the diene derivative of hydrocortisone has been found to be considerably more effective in a daily dose of 50 mg. than 75 to 100 mg. of cortisone acetate, or of hydrocortisone. Whereas a patient standardized on a 75 to 100 mg. dosage of cortisone acetate, or of hydrocortisone would require 90 to 110 mg. of codeine per day to be relieved of pain when the dosage of the cortisone acetate of hydrocortisone was reduced to 50 mg. per day, this dosage (50 mg.) of the diene derivative of hydrocortisone requires no supplemental treatment with codeine and has given complete relief from pain. In fact, a daily oral dose of 50 mg. of the diene derivative of hydrocortisone had even more favorable results than a daily oral dose of 75 to 100 mg. of cortisone acetate or of hydrocortisone, as it gave greater relief from pain, as evidenced by the ability of the arthritic patient to clench the fist, walk briskly, and engage in other muscular activity without pain. In the widely accepted eosinophile test (Rosemberg, E., et al., Endocrinology 54, 363 (1954)), for cortical hormone activity, the dienes corresponding to cortisone and hydrocortisone are several times as potent as the corresponding natural hormones. Similar improved clinical results have been obtained by the use of the diene derivative of cortisone and of its acetate following similarly improved action found in experimental animals of which one group was treated with the diene derivative of cortisone acetate and another group with cortisone acetate. In general, the $\Delta^1$-dehydro derivatives (herein sometimes called the 1,4-dienes) of cortisone and hydrocortisone and their 21-acetates are of about equal potency.

This pronounced enhancement of activity is of tremendous importance since it permits a reduced dose of a very expensive drug to accomplish the same beneficial actions for which cortisone and hydrocortisone and their acetates have been employed at considerably higher dosage levels in arthritis and other human afflictions. Still greater therapeutic significance is imparted to my new compounds by the fact that the incidence of side effects commonly associated with the use of cortisone and hydrocortisone is very markedly diminished.

In order to obtain a desirable growth of *Corynebacterium simplex* (A.T.C.C. 6946) for the process of this invention, a suitable nutrient medium is prepared containing carbohydrates, organic nitrogen, cofactors, and inorganic salts. It is possible to omit the use of carbohydrates without completely impairing the growth of the organism. In carrying out my process, the steroid compound, as a solid or dissolved or suspended in ethanol, acetone or any other water-miscible solvent which is non-toxic toward the organism in the concentration employed is added to the cultivated microorganism in a broth medium under sterile conditions. This culture is then shaken, aerated, or simultaneously aerated and agitated, in order to enhance the growth of the *Corynebacterium simplex* and the biochemical conversion of the steroid substrate. The steroid may be added to the broth medium and then inoculated with the bacterium, or the cultivated microorganism in broth medium may be added to the steroid. In certain cases, depending on the conditions of the reaction medium, it may be more desirable to obtain optimum growth of the microorganism before the addition of the steroid. Alternatively, the enzyme preparations obtained in known manner from cultures of *Corynebacterium simplex* may be used for carrying out the process.

A useful method for carrying out the process is the cultivation of *Corynebacterium simplex* on a suitable nutrient medium under aerobic conditions. After cultivation of the microorganism, the cell mass may be harvested by centrifuging the nutrient broth, decanting the supernatant liquid and suspending the cell mass in saline. A suitable volume of the cell suspension is then seeded into a desirable nutrient medium for supporting growth of the microorganism. The nutrient medium employed may be a yeast extract (Difco), casein hydrolysate (N-Z-Amine) (Type B Sheffield), corn steep liquor, water extract of soybean oil meal, lactalbumin hydrolysate (Edamine-Sheffield Enzymatic), fish solubles, and the like.

Inorganic salts are desirable to maintain a pH level in the reaction medium of between 6.8 and 7.2. However, the use of inorganic salts for buffering the reaction mixture may be omitted. The omission of inorganic salts causes the pH to rise from an initial value of 6.8 to about 7.7–8. This, however, will still permit the formation of desired steroidal end products. The optimum temperature for growth of the selected microorganism is about 37° C., but the temperature may vary between 25° and 37°, and even between 20° or lower and 40°. The time of reaction may vary from as little as 12 hours to as much as 48 hours or more. The length of time which is employed will depend on the steroid which is being transformed. Any water miscible, non-toxic (to the organism) solvent may be employed to dissolve or suspend the steroid. I prefer to use ethanol or acetone in such amounts that the final concentration of these solvents in the reaction mixture is no higher than about 7% and may amount to only traces; owing to evaporation, the final concentration of the organic solvent may even be practically zero.

Following the oxidation or dehydrogenation, the reaction products may be recovered by extraction with a suitable adsorbent, or by any one of the other procedures commonly used in the art. For extraction, chlorinated lower hydrocarbons, ketones, and alcohols are useful. These include chloroform, methylene chloride, trichloroethane, ethylene dichloride, butanol, diethylketone, and others. I prefer to use extraction as the method for isolating the steroidal products. Following extraction, the products may be isolated by concentration of the extracts to a small volume or to dryness. Purification of the residues may be then accomplished in several ways. In many instances, simple recrystallizations from a suitable solvent or solvent mixture, such as acetone, methylene chloride, ethanol, acetone-hexane, methylene chloride-hexane, etc., affords the desired dienone in excellent yield and high state of purity. Where there are several products formed in the same reaction, a separation is conveniently achieved by chromatography on silica gel, magnesium silicate (Florisil), alumina or other commonly employed adsorbents.

It should be undestood that where a mixture of more polar steroids is to be separated, more polar eluents will be required in chromatographic separation. Furthermore, the activity of the adsorbent varies from batch to batch and consequently the same steroids may be more strongly or more weakly held in parallel experiments which will result in variation of the value of the concentration of the eluents which will elute a given steroid. In any case, the order of elution will remain the same for a given adsorbent and a given solvent system.

The 1,4-diene structure of the products has been established in various ways. Infrared analyses, ultra-violet analyses, rotational analyses, degradative studies and carbonhydrogen analyses have been employed where necessary to establish the nature of the products. Furthermore, introduction of the $\Delta^1$-unsaturation in a 3-keto-$\Delta^4$-steroid is known to have a characteristic negative effect on the molecular rotation of the product. I have observed this shift in rotation in the dienones which I have prepared from cortisone and hydrocortisone, among others. In similar fashion, all of the other products have been carefully identified.

The chemical transformations which can be accomplished by subjecting the various 10,13-dimethyl steroids to the action of a culture of *Corynebacterium simplex* (the term "culture" of *Corynebacterium simplex*" is to be understood in this specification and in the claims as including the enzymatic extract of such culture) are thus of widely different kinds, and can take place singly, or two or more of such transformations can occur simultaneously or in sequence.

While the lower alkanoic esters are generally preferred, and particularly the acetates, as above indicated, it will be understood that the specific character of the ester is not controlling in my process and that other esters, both of organic and inorganic acids may be employed, such as cylopentyl and cyclohexyl acetates, propionates and butyrates, and also the phosphates, polyphosphates and sulfates, it being necessary only that the esters be non-toxic toward the microorganism. The hyroxylated products of my process can, if desired, be converted into their corresponding esters by known procedures, for example, into their lower alkanoic and particularly their acetic acid esters.

The fish solubles referred to hereinbefore are presently available commercially as an extract of herring, menhaden, and various mixtures thereof, which has been subjected to an enzymatic hydrolysis. The material can be added directly to the culture broth for supplying the nutrient material. Where fish solubles (50% solid content) are available which have not been subjected to enzyme-enzymatic hydrolysis, such extracts should be diluted with water and steamed for about 10 minutes at 90° C. followed by filtration, preferably with the aid of Filter-Cel.

The invention will be described in further detail in the following examples which are presented by way of illustration only and not as indicating the scope of the invention.

EXAMPLE 1

*Conversion of cortisone of $\Delta^{1,4}$-pregnadiene-17α,21-diol 3,11,20-trione*

From a solution of 30 g. of yeast extract (Difco) in 3.0 l. of tap water containing 13.2 g. of potassium dihydrogen phosphate and 26.4 g. of disodium hydrogen phosphate (pH of the solution 6.9) 27 portions of 100 ml. each are withdrawn, placed in 300 ml. Erlenmeyer flasks and sterilized by autoclaving for 15 minutes at 15 lb. steam pressure (120° C.). After autoclaving and cooling of the broth one ml. of a suspension of *Corynebacterium simplex* (A.T.C.C. 6946) is placed in each flask. The flasks are then shaken on a shake table at 220 r.p.m. and 28° C. for 24 hours.

Into each of 27 Erlenmeyer flasks are placed 150 mg. of cortisone. The flasks and contents are then sterilized for 15 minutes at 15 lb. steam pressure (120° C.). To each flask are then added 5.0 ml. of ethanol. The 24-hour bacterial culture is then transferred aseptically and the resulting suspensions are shaken on a shake table at 220 r.p.m. and 28° C. for 48 hours. The final pH is 7.2.

The contents of all the flasks are combined and extracted with a total of 9.0 l. of chloroform in three equal portions. The combined extracts are then concentrated to a residue which is crystallized from acetone-hexane. There results 1.1 g. of $\Delta^{1,4}$-pregnadiene-17α,21-diol-3,11,20-trione, M.P. 210–215° (dec.). Several additional recrystallizations raised the M.P. to 230–232° (dec.): $[\alpha]_D^{25}$+175.3 (dioxane); $\epsilon_{238}$ 15,400 (methanol).

The infrared spectrum of the product shows the presence of a $\Delta^{1,4}$-diene-3-one system, hydroxyl and additional carbonyl (6-membered ring or side chain). The structure of the product is established as $\Delta^{1,4}$-pregnadiene-17α,21-diol-3,11,20-trione by degradation to $\Delta^{1,4}$-androstadiene-3,11,17-trione (identical with an authentic sample) and by formation of a monoacetate by the action of acetic anhydride-pyridine which shows a characteristic interaction of the C-20 carbonyl with the C-21 acetate in the infrared spectrum.

*21-acetylation of $\Delta^{1,4}$-pregnadiene-17α,21-diol 3,11,20-trione*

To a solution of 0.5 g. of $\Delta^{1,4}$-pregnadienne-17α,21-diol-3,11,20-trione in 5 ml. of anhydrous pyridine are added 3 ml. of acetic anhydride. The reaction mixture is permitted to stand overnight at room temperature and is then diluted with ice and water. The resulting precipitate is filtered and recrystallized from acetone-hexane. There is obtained 0.35 g. of $\Delta^{1,4}$-pregnadiene-17α,21-diol-3,11,20-trione 21-acetate, M.P. 227–228° d. After several recrystallizations from acetone hexane it is melted at 233–236° (dec.).

EXAMPLE 2

*Conversion of hydrocortisone to $\Delta^{1,4}$-pregnadiene-11β,17α,21-triol-320-dione*

From a solution of 3 g. of yeast extract (Difco) in 3.0 l. of tap water containing 13.2 g. of potassium dihydrogen phosphate and 26.4 g. of disodium hydrogen phosphate (pH of the solution, 6.9) 27 portions of 100 ml. each are withdrawn, placed in 300 ml. Erlenmeyer flasks an sterilized by autoclaving for 15 minutes at 15 lb. steam pressure (120° C.). After autoclaving and cooling of the broth, one ml. of a suspension of *Corynebacterium simplex* (A.T.C.C. 6946) is placed in each flask. The flasks are then shaken on a shake table at 220 r.p.m. and 28° C. for 24 hours.

Into each of 27 Erlenmeyer flasks are placed 150 mg. of hydrocortisone. The flasks and contacts are then sterilized for 15 minutes at 15 lb. steam pressure (120° C.). To each flask are then added 5.0 ml. of ethanol. The 24-hour bacterial culture is then transferred aseptically and the resulting suspensions are shaken on a shake table at 220 r.p.m. and 28° C. for 48 hours. The pH at the end of the shake period is 7.0.

The contents of all the flasks are combined and extracted with a total of 9.0 l. of chloroform in three equal portions. The combined extracts are then concentrated to a residue which weighs 3.75 g. The M.P. of the residue is 227–232°. From 2.75 g. of this crude material on sludging with 50 ml. of acetone and cooling, there is recovered on filtration 1.35 g. of $\Delta^{1,4}$-pregnadiene-11β,17α,21-triol-3,20-dione, M.P. 237–239° (dec.). Additional product can be recovered from the mother liquor. Recrystallization from acetone raised the M.P. to 239–241° (dec.); $[\alpha]_D^{25}$ +107° (dioxane); $\epsilon_{243}$ 14,600 (methanol).

The infrared spectrum indicates the presence of a $\Delta^{1,4}$-diene-3-one system, hydroxyl and a 6-membered ring or side-chain ketone (in addition to the dienone carbonyl). From this evidence and the fact that a mono-acetate is formed with acetic anhydride-pyridine whose infrared spectrum shows the expected interaction between the C-21 acetate and the C-20 carbonyl group, the product of fermentation is proven to possess the assigned structure.

*21-acetylation of $\Delta^{1,4}$-pregnadiene-11β,17α,21-triol-3,20-dione*

To a solution of 0.85 g. of $\Delta^{1,4}$-pregnadiene-11β,17α,21-triol-3,20-dione in 5 ml. of pyridine are added 3 ml. of acetic anhydride. The reaction mixture is allowed to stand at room temperature overnight and is then diluted with ice water. The resulting precipitate is filtered from the mixture and recrystallized from acetone-hexane. There is recovered 0.45 g. of $\Delta^{1,4}$-pregnadiene-11β,17α,21-triol-3,20-dione 21-acetate, M.P. 235–239°. On recrystallization, the M.P. rose to 237–239°; $[\alpha]_D^{25}$ +116° (dioxane); $\epsilon_{243}$ 15,000 (methanol).

Other esters of the diene derivatives of cortisone and hydrocortisone can be similarly prepared by reaction with the anhydride of the acid or with its chloride in known manner. While the acetates of the adrenal hormones are those most commonly used in therapy, it will be evident that other lower alkanoyl esters may be produced such as the formates, propionates, butyrates, and valerates, and likewise the esters of other non-toxic acids, like the benzoates, and also the neutral and acid esters of polybasic acids, like succinic, maleic, malic, citric, tartaric, phthalic and hexahydrophthalic. In the case of the acid esters, the metal salts can be formed in the usual manner by reaction with the hydroxide, carbonate or bicarbonate of the metal, as of the alkali and alkaline earth metals. The 21-acetates of the 1,4-dienes of cortisone and hydrocortisone are generally preferred, and likewise the sodium salts of the 21-acid phthalates or other acid esters.

Instead of forming the 1,4-dienes of cortisone and hydrocortisone and subsequently esterifying the products, the corresponding esters of cortisone and hydrocortisone and of their intermediates can be subjected to the process of the present invention and will yield the dienes of the esters of cortisone and hydrocortisone; however, as above indicated, by suitable control of the reaction conditions, the 21-alcohols can also be obtained from the 21-esters. Thus in Example 1, cortisone can be replaced by its 21-ester or by its 17α,21-diester (such as the acetate ester), or by 5-pregnen-3,17α,21-triol-11,20-dione 21-acetate or 17α,21-diacetate, or 3,17α,21-triacetate or other esters; while in Example 2 hydrocortisone can be replaced by its 21-acetate, or 17α,21-diacetate, or 11β,17α,21-triacetate; or by 5-pregnen-3,11β,17α,21-tetrol-20-one, 3,21-diacetate, 3,17α,21-triacetate or 3,11β,17α,21-tetraacetate. The latter group of compounds can be replaced by the corresponding 11α-hydroxy epimers, to yield the 11-epimers of the diene of hydrocortisone and its 21-esters and 17α,21-diesters. The polyesters can in all cases be mixed-esters, like 3-propionate 21-acetate.

Examples of these variations of my process are presented by way of illustration in the following:

EXAMPLE 3

*Conversion of hydrocortisone 21-acetate to the 1,4-diene and its 21-acetate*

The reaction is run exactly as described for the transformation of hydrocortisone (4-pregnene-11β,17α,21-triol-3,20-dione) to the corresponding diene (Example 2), and the product is isolated by chloroform extraction and crystallization from acetone. From 1.0 g. of hydrocortisone 21-acetate there is obtained 0.22 g. of 1,4-pregnadiene-11β,17α,21-triol-3,20-dione, M.P. 239–241° (dec.).

When it is desired to suppress the deacetylation reaction, the same conditions as above are used with the exception that the temperature of the environment for the growth and reaction phases of the process is raised to 36° C. The product is isolated in the usual way. From 1.0 g. of hydrocortisone 21-acetate there results 0.13 g. of hydrocortisone diene 21-acetate, M.P. 237–239° (dec.).

EXAMPLE 4

*Conversion of cortisone 21-acetate to the 1,4-diene and its 21-acetate*

The reaction is conducted as described for the transformation of cortisone (4-pregnene-17α,21-diol-3,11,20-trione) to the corresponding diene (Example 1), and the product is isolated by chloroform extraction and crystallized from acetone-hexane. From 1.0 g. of cortisone acetate there is isolated 0.17 g. of $\Delta^{1,4}$-pregnadiene-17α,21-diol-3,11,20-trione, M.P. 230–232°.

When it is desired to suppress the deacetylation, the same conditions as above are used with the exception that the temperature of the environment for the growth and reaction phases of the process is raised to 36° C. The product is isolated in the usual way. From 1.0 g. of cortisone acetate there results 0.11 g. of cortisone diene-21-acetate, M.P. 230–233° (dec.).

EXAMPLE 5

*Conversion of 4-pregnene-11α,17α,21-triol-3,20-dione to 1,4-pregnadien-11α,17α,21-triol-3,20-dione*

The reaction is run exactly as described in the transformation of 4-pregnene-11β,17α,21-triol-3,20-dione to the corresponding diene, the product is isolated by chloroform extraction and crystallized from acetone-hexane. From 1.0 g. of 11-epi hydrocortisone there is isolated 0.25 g. of $\Delta^{1,4}$-pregnadiene-11α,17α,21-triol-3,20-dione as a crystalline solid.

Acetylation of the free 21-ol is effected by dissolving 1.0 g. of 1,4-pregnadiene-11α,17α,21-triol-3,20-dione in 15 ml. of anhydrous pyridine followed by addition of 0.3 g. of acetic anhydride. The reaction mixture is allowed to stand at room temperature overnight and is then poured into ice-water. The resulting precipitate is separated by filtration and recrystallized as a crystalline solid ($\Delta^{1,4}$-pregnadiene-11α,17α,21-triol-3,20-dione 21-acetate) from acetone-hexane. Other 21-lower alkanoates are prepared in similar manner. Oxidation of the 11α-hydroxy group in either of the products prepared above, and preferably the ester, is effected by dropwise adding to a solution of about 160 mg. of the acetate in 10 ml. of acetic acid, a solution of 30 mg. of chromic acid in 2 ml. of acetic acid containing 0.5 ml. of water. The mixture is stirred several hours at room temperature, diluted with methanol and evaporated to a residue in vacuo. The residue is then suspended in dilute sodium bicarbonate solution and extracted with chloroform-ether, the extracts are dried and evaporated to a residue yielding the 11-keto compound of Example 1.

I claim:

1. A member of the group consisting of 1,4-pregnadiene-11α,17α,21-triol-3,20-dione and the 21-lower alkanoyl esters thereof.

2. 1,4-pregnadiene-11α,17α,21-triol-3,20-dione.

3. 1,4-pregnadiene-11α,17α,21-triol-3,20-dione 21-lower alkanoate.

4. 1,4-pregnadiene-11α,17α,21-triol-3,20-dione 21-acetate.

References Cited by the Examiner

UNITED STATES PATENTS

| | | | |
|---|---|---|---|
| 2,602,769 | 7/52 | Murray et al. | 195—51 |
| 3,134,718 | 5/64 | Nobile | 167—65 |

LEWIS GOTTS, *Primary Examiner.*